April 15, 1941.   A. LANGSNER   2,238,118
ADJUSTING MEANS FOR TELESCOPES
Original Filed Feb. 4, 1938
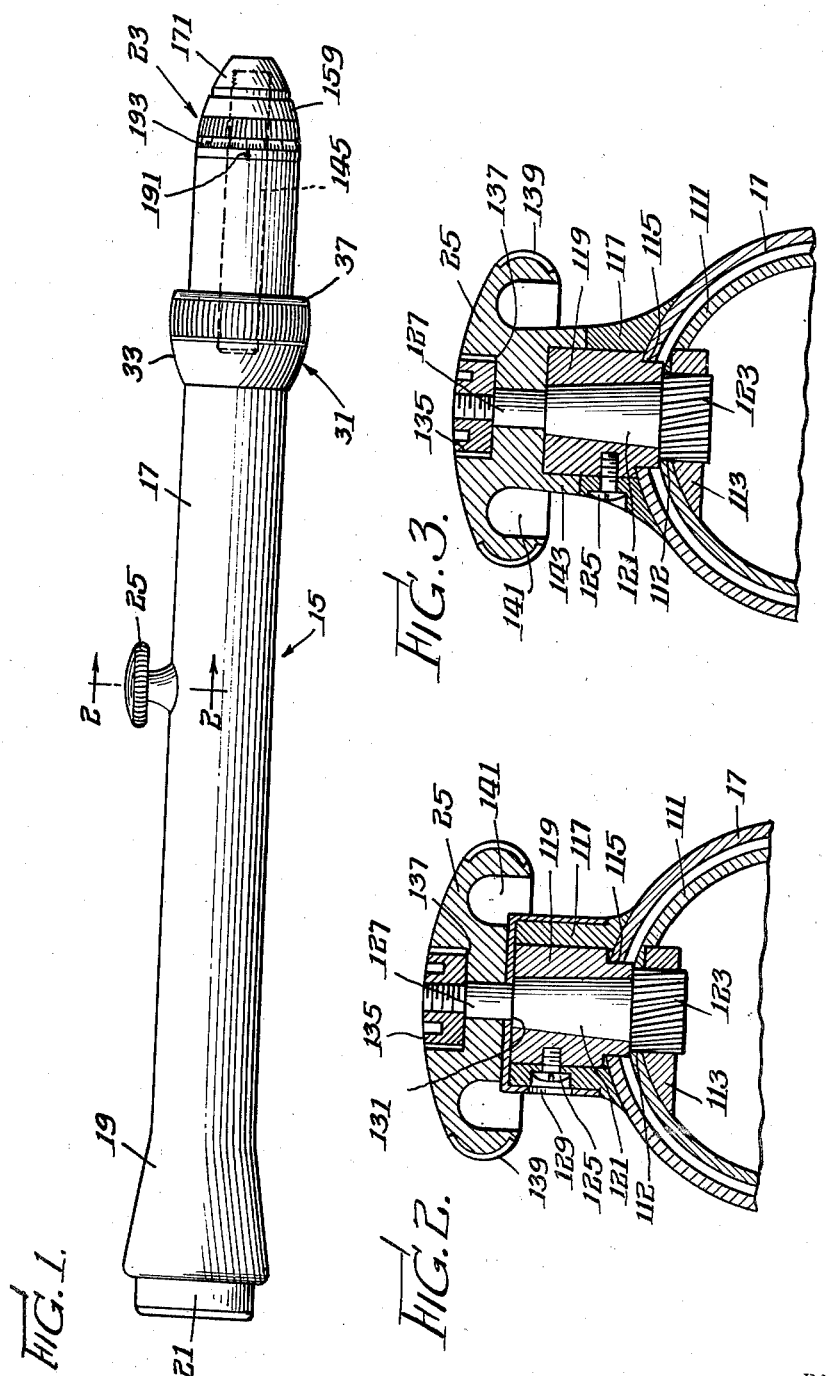
INVENTOR.
Adolph Langsner
BY: Cox & Moore
ATTORNEYS.

Patented Apr. 15, 1941

2,238,118

UNITED STATES PATENT OFFICE 2,238,118

ADJUSTING MEANS FOR TELESCOPES

Adolph Langsner, Chicago, Ill., assignor to Eugene Dietzgen Co., Chicago, Ill., a corporation of Delaware Original application February 4, 1938, Serial No. 188,595. Divided and this application November 17, 1938, Serial No. 241,011

5 Claims. (Cl. 88—32)

My invention relates in general to telescopes and has more particular reference to telescopes adapted for use in surveying instruments such as levels, transits, and the like, the present application comprising subject-matter divided from my copending application, Serial No. 188,595, filed February 4, 1938.

An important object is to provide telescopes of improved streamlined appearance and of simplified construction whereby operation of the instrument is facilitated, the operating parts being designed to exclude dirt, moisture and other foreign matter from entering the same and causing deterioration.

Another important object is to provide a telescope having an adjustable part therein and adjusting means accessible from outside of the telescope and operable to adjust the part within the telescope, including closure means for preventing entry of foreign matter into the casing of the telescope at said adjusting means.

Another important object is to provide an instrument comprising a telescope having focusing means shiftable within the barrel of the telescope and adjusting means accessible from outside of the barrel of the telescope for shifting the focusing means within the barrel and dust-proof means affording connection through the telescope barrel between said focusing and adjusting means.

Another important object is to provide dust-excluding adjusting means for the objective focusing slide of a telescope comprising a handle exposed outwardly of the telescope and operable to adjust the objective slide within the instrument.

Numerous other objects and advantages of the invention will be apparent from the following description, which, taken in connection with the accompanying drawing, discloses preferred embodiments of the invention.

Referring to the drawing,

Figure 1 is a perspective view of a telescope embodying my present invention;

Figure 2 is an enlarged sectional view taken substantially along the line 2—2 in Figure 1; and Figure 3 is a similarly enlarged sectional view illustrating a modified construction.

To illustrate my invention, I have shown, on the drawing, a telescope 15 of substantially streamlined appearance. The telescope in the illustrated embodiment comprises a tubular barrel 17 of preferably cylindrical configuration, which may be belled or enlarged at one end as at 19 to receive an objective lens assembly 21. The end of the telescope opposite from the objective lens assembly may be provided with an eye-piece assembly 23, the exposed portions of which are preferably shaped to a bullet nose configuration in order to improve the appearance of the telescope and reduce wind resistance.

A laterally projecting manually operable knob 25 is also provided upon the barrel of the telescope to enable adjustment of a focusing slide of any suitable or convenient form within the barrel of the telescope. Opposite the inner end of the eyepiece assembly 23 a cross-hair reticle may be arranged. This reticle may comprise a part adjustable within the barrel of the telescope as by means of threaded adjusting screws mounted radially on the reticle and extending through a circumferentially arranged series of openings in the wall of the barrel opposite the position occupied by the reticle therein.

The reticle adjusting screws have heads received in a closure assembly 31 carried on the barrel and comprising a frame 33 formed with an annular channel, in which the heads of the adjusting screws are received. A removable cover 37, adapted for mounting on the frame in position to sealingly enclose the heads of the adjusting screws in the annular channel may be provided.

The barrel 17 of the telescope carries focusing means comprising a shiftable element 111 carrying a focusing lens within the barrel between the eyepiece and the objective cell 21. The shiftable element preferably comprises a sleeve 111 mounted for longitudinal movement within the barrel, and focusing is accomplished by moving this sleeve in order to vary the spacement between the objective cell and the focusing lens carried by the sleeve. I provide suitable dust-proof means for shifting the focusing sleeve within the barrel of the telescope in response to manipulation of the knob 25 outside of the barrel. The focusing sleeve is provided with a slot, and a rack 113 is fastened to the inner wall of the sleeve adjacent the slot. The barrel of the telescope also is formed with a preferably circular perforation 115 opposite the elongated slot of the focusing sleeve and carries an upstanding projection 117 comprising a sleeve, collar or boss on the outer walls of the telescope, said projection having a channel in alignment with the perforation 115. The projection receives and supports a sleeve or bushing 119 in the channel thereof, said bushing forming a tapered bearing for a correspondingly tapered shaft 121, one end of which extends within the barrel of the telescope and carries a pinion 123 is position in the elongated slot of the focusing sleeve to engage said rack 113. The bushing 119 snugly fits within the channel of the collar 117 and is held in place in any suitable fashion as by the set screw 125. The shaft 121 has an end 127 extending upwardly of the bushing 119, said shaft extension being of reduced diameter and carrying the knob 25. Means forming a dependent skirt on the knob is provided and, as shown in Figure 2, may comprise a sheet metal element 129 which overlies the outwardly facing ends of the collar 117, bushing 119, and the shoulder 131 formed at the junction of the tapered shaft portion 121 and the shaft extension 127. The peripheral portions of the sheet metal element 129 preferably form an annular flange overlying the outer surfaces of the collar 117. The purpose of the element 129 is to prevent access of foreign matter into the barrel of the telescope through the outer ends of the elements 117 and 119. The outer extremity of the shaft extension 127 carries the focusing knob 25, which is held snugly in place thereon by means of a nut 135 threading on said shaft extension and seating in a socket 137 formed in the upper surface of the knob. The knob and nut are of preferably streamlined configuration and the knob may be knurled at its peripheral edges as shown at 139 to facilitate turning of the same. The knob also may be provided with an annular groove 141 on its under side in order to reduce its weight.

In Figure 3, I have shown a modified form of the dust-proof focusing mechanism, in which the shield 129 is eliminated and the knob 25 is provided with a dependent skirt 143 extending in position to embrace the upper portions of the collar 117 so that the knob itself encloses and prevents entrance of foreign matter through the outer ends of the elements 117 and 119. The skirt portions 143 of the knob and the lower portions of the collar 117 may have their outer surfaces lying in a continuous streamlined plane in order to improve the external appearance of the dust-proof focusing mechanism.

The eyepiece assembly 23 comprises a lens-carrying tube or frame 145 enclosed in the end of the telescope barrel. The tubular lens element 145 projects from the barrel at its outer end through a turnable adjusting collar 159 and is provided with a cover affording a peep hole opposite the outer end of the lens tube 145. The cover 171 has outer lateral surfaces formed to continue the configuration of the outer surfaces of the part 159, and the cover may be formed with an annular flange slidably fitting into a groove in the collar 159 to provide for relative longitudinal movement between the parts, while preventing the entrance of foreign matter into the assembly.

If desired, the peripheral surface of the rotatable member 159 and the adjacent end of the telescope barrel, may be formed with an index 191 and cooperating scale 193 adapted to indicate the adjustment of the eyepiece, the scale 193 being preferably on the rotatable head 159.

It will be seen from the foregoing that the unit is dust-proof and that its exposed portions afford an attractive streamlined appearance in the telescope. The reticle closure assembly affords means preventing foreign matter from entering the telescope barrel while at the same time furnishing an attractive streamline appearance on the telescope.

Finally, the assembly provides for substantially dust-proof operation of the internal mechanism from the exterior of the barrel, the exterior portions of the focusing assembly being of attractive streamlined appearance.

It is though that the invention and numerous of its attendant advantages will be understood from the foregoing description, and it is obvious that numerous changes may be made in the form, construction, and arrangement of the several parts of the illustrated apparatus without departing from the spirit or scope of my invention or sacrificing any of its attendant advantages, the preferred modes and forms herein described being merely for the purpose of illustrating the invention.

The invention is hereby claimed as follows:

1. A telescope comprising a barrel, an adjustable support for an optical element in the barrel, said barrel having a lateral opening, a sleeve secured on said barrel at said opening and communicating therewith, a bushing secured in said sleeve and opening at one end upon said barrel and at the other end outwardly of said sleeve, adjusting means journaled in said bushing and cooperatively associated with said adjustable support within the barrel, said means having a portion extending in said opening and a portion exposed outwardly of said bushing, and adapted for manipulation from outside of the barrel to move the adjustable support within the barrel, and means forming an annular dependent skirt on the outwardly exposed portions of said adjusting means in position to snugly embrace and ride upon the outer cylindrical surfaces of said bushing whereby to prevent the entrance of foreign matter into the barrel between the adjusting means and said bushing.

2. A telescope comprising a barrel, an adjustable support for an optical element in the barrel, said barrel having a lateral opening, a sleeve secured on said barrel at said opening and having an end communicating therewith, a bushing secured in said sleeve with an end of the bushing extending into said barrel opening, the other end of said bushing extending outwardly of said sleeve, adjusting means cooperatively associated with the adjustable support within the barrel and having a portion extending in said bushing, said adjusting means having a portion exposed outwardly of said bushing and sleeve and adapted for manipulation from outside of the barrel to move the adjustable support within the barrel, and means forming an annular skirt on the outwardly exposed portions of said adjusting means in position snugly embracing and movable upon the surfaces of said bushing outwardly of said sleeve to form a running seal therewith whereby to prevent foreign matter from entering the barrel through said sleeve and bushing.

3. A telescope as set forth in claim 1, wherein the sleeve forms an annular seat encircling said bushing in position to engage the terminal edge of said annular skirt to form a running seal between said sleeve and said skirt.

4. A telescope as set forth in claim 1, wherein said adjusting means comprises a stem formed with a shoulder facing outwardly of said bushing and wherein the means forming the annular dependent skirt comprises a cup-shaped shell having a central bottom opening for receiving the outwardly exposed portions of said adjusting means, and a manually operable knob secured on the outwardly exposed portions of said adjusting means in position to clamp the bottom of said shell between said knob and said outwardly facing shoulder.

5. A telescope comprising a barrel, an adjustable support for an optical element in the barrel, said barrel having a lateral opening, a sleeve secured on said barrel at said opening and communicating therewith, a bushing, secured in said sleeve, and opening at one end upon said barrel, and opening at the other end outwardly of said sleeve, adjusting means comprising a stem having a tapered portion journaled in said bushing and tapering toward the outer end of the bushing, said stem being drivingly connected with said adjustable support within the barrel and having an end extending outwardly of said bushing, said stem being formed with an outwardly facing shoulder at the outer end of said bushing, and means clampingly secured on the outwardly extending portions of said stem against said shoulder and comprising a manually operable knob adapted for manipulation outwardly of the barrel to turn said stem and thus move the adjustable support within the barrel and an annular dependent skirt snugly embracing and riding upon the outer cylindrical surfaces of the bushing to thereby prevent entrance of foreign matter into the barrel through said sleeve and bushing.

ADOLPH LANGSNER.